(12) United States Patent
Eutebach

(10) Patent No.: US 9,000,757 B2
(45) Date of Patent: Apr. 7, 2015

(54) MONITORING A ROTATIONAL ANGLE SENSOR

(75) Inventor: Thomas Eutebach, Hameln (DE)

(73) Assignee: Lenze Automation GmbH, Aerzen (DE)

( * ) Notice: Subject to any disclaimer, the term of this patent is extended or adjusted under 35 U.S.C. 154(b) by 507 days.

(21) Appl. No.: 12/994,317

(22) PCT Filed: May 26, 2009

(86) PCT No.: PCT/EP2009/056335
§ 371 (c)(1),
(2), (4) Date: Apr. 7, 2011

(87) PCT Pub. No.: WO2009/153133
PCT Pub. Date: Dec. 23, 2009

(65) Prior Publication Data
US 2011/0187358 A1 Aug. 4, 2011

(30) Foreign Application Priority Data
May 25, 2008 (DE) .......................... 10 2008 024 527

(51) Int. Cl.
*G01B 7/30* (2006.01)
*G01D 5/244* (2006.01)
*G01D 5/20* (2006.01)

(52) U.S. Cl.
CPC .............. *G01D 5/2448* (2013.01); *G01D 5/204* (2013.01); *G01D 5/24461* (2013.01)

(58) Field of Classification Search
CPC .............. G01D 5/2073; G01D 5/2046; G01D 5/24452; G01D 5/2448; G01D 5/204; G05B 19/33; G01F 1/66; G01R 25/06; G01R 33/0283
See application file for complete search history.

(56) References Cited

U.S. PATENT DOCUMENTS 3,576,986 A * 5/1971 Brickner et al. ................... 708/4
3,603,979 A * 9/1971 Kosakowski .................. 341/119
(Continued)

FOREIGN PATENT DOCUMENTS

| CN | 1719270 A | 1/2006 |
| CN | 1748186 A | 3/2006 |

(Continued)

OTHER PUBLICATIONS

International Search Report for PCT/EP2009/056335; mailed Nov. 16, 2009; 4 pages.
(Continued)

*Primary Examiner* — Vinh Nguyen
(74) *Attorney, Agent, or Firm* — Hunton & Williams LLP

(57) ABSTRACT

The invention relates to a monitoring method in which two variables of angle-dependent, amplitude-modulated carrier frequency signals are emitted on orthogonal windings (12a, 12b) of the rotational angle sensor and an evaluation is carried out by an input amplifier (V2, 11) which emits an output signal that is essentially zero when the signals of the variables are generated according to functional usage. Alternately, an interference signal is generated at one-second intervals in both windings (12a, 12b) of the rotational angle sensor, the result of which is being evaluated and monitored by means of an input amplifier (V2, 11). An interference display signal is generated at the output of the input amplifier (V2, 11), said interference display signal being not equal to zero if no error or interruption is present in the system and equal to zero if an error or interruption is present in the system.

24 Claims, 1 Drawing Sheet

(56) References Cited

U.S. PATENT DOCUMENTS

| | | | |
|---|---|---|---|
| 4,529,922 A * | 7/1985 | Ono | 318/603 |
| 6,822,416 B1 | 11/2004 | Kunz et al. | |
| 6,958,620 B1 | 10/2005 | Kozuki | |
| 7,388,527 B2 | 6/2008 | Kushihara | |
| 2002/0175645 A1 | 11/2002 | Fujimoto et al. | |
| 2006/0186891 A1 | 8/2006 | Tinebor | |
| 2008/0052562 A1 | 2/2008 | Kameya et al. | |
| 2009/0167296 A1 * | 7/2009 | Yokokawa | 324/207.25 |

FOREIGN PATENT DOCUMENTS

| | | |
|---|---|---|
| CN | 101131328 A | 2/2008 |
| CN | 102089628 | 5/2014 |
| DE | 100 35 783 A1 | 2/2001 |
| DE | 10 2005 001 702 | 2/2006 |
| DE | 602004006726 | 1/2008 |
| WO | WO 2004/070924 | 8/2004 |

OTHER PUBLICATIONS

PCT Written Opinion of the International Searching Authority for PCT/EP2009/056335; mailed Nov. 16, 2009; 6 pages.

PCT International Preliminary Report on Patentability for PCT/EP2009/056335; Dated Sep. 20, 2010; 26 pages.

German Patent Office Communication for DE 10 2008 024 527.5; mailed Apr. 20, 2009; 3 pages.

Zhao Tong, Li Qing-Min, Zhang Guo-Qiang, Zhang Guo-Bin, On-line Monitoring Method of the Rotating Angle of Drive Motor for On-load Tap Changers, China Academic Journal Electronic Pulishing House, High Voltage Apparatus, Oct. 2005, pp. 343-346, vol. 41, No. 5; see English Abstract.

* cited by examiner

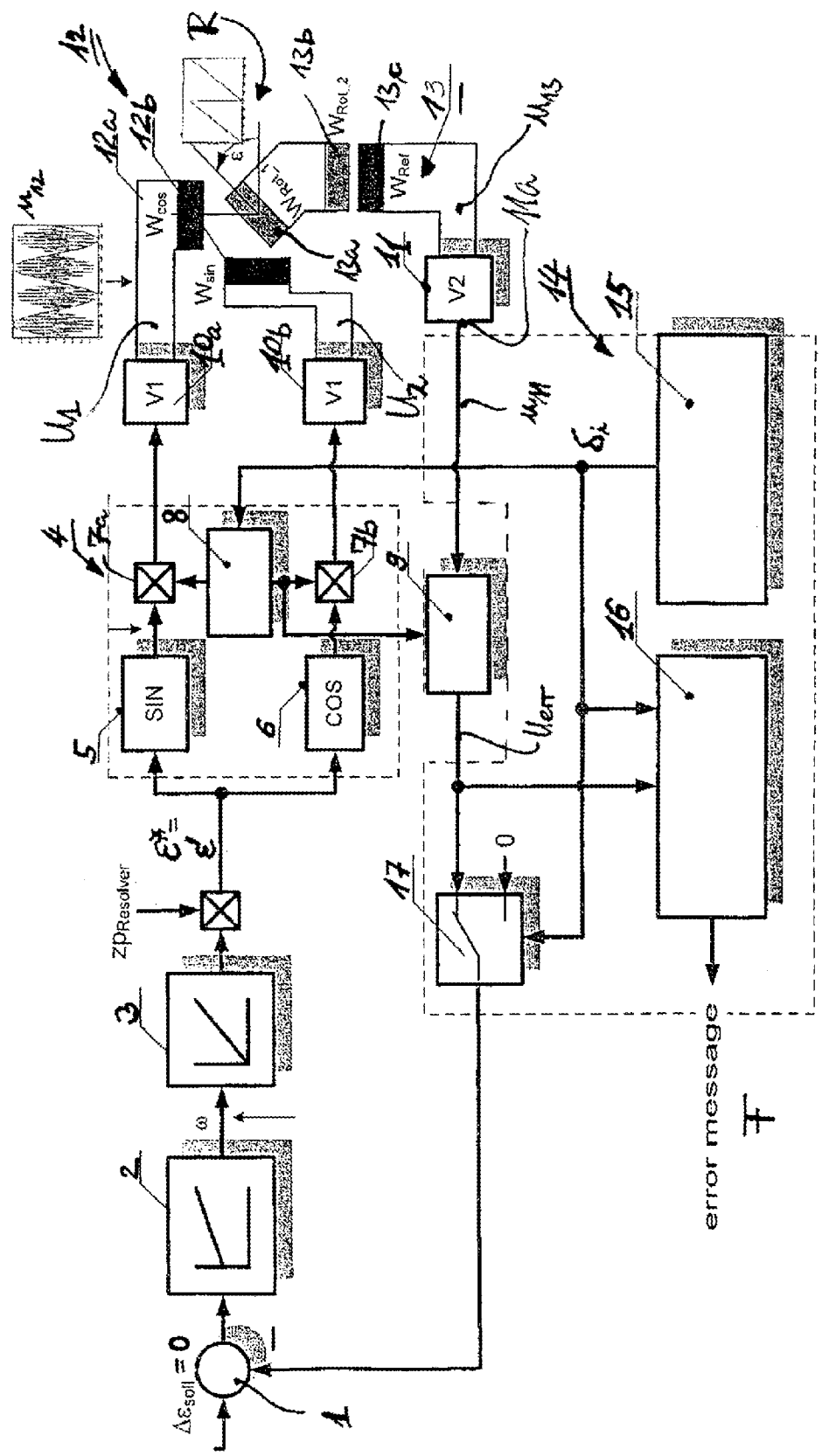

MONITORING A ROTATIONAL ANGLE SENSOR

CROSS-REFERENCE TO RELATED APPLICATIONS

The application is a U.S. National Stage Application of International Application of PCT/EP2009/056335 filed May 26, 2009.

FIELD OF THE DISCLOSURE

The present invention relates to a method and a device for monitoring a rotational angle sensor on an electric machine and is used, for instance, in measurement systems using a resolver.

BACKGROUND

For position detection of moving machine parts and drives resolvers have proven to be reliable and cost-efficient in industrial applications. If the controlling of the machine or the application requires a determination of an angle very frequently resolvers are used due to their robust construction. The resolver is an absolute position or angle measurement system that is based on an inductive principle and is in its configuration similar to an electric motor having precision windings. While the stator of the resolver bears two winding groups whose winding planes are perpendicular and are spatially offset to each other ($W_{sin}$, $W_{cos}$), the rotor comprises a rotary transformer that is supplied at its primary side by an excitation winding ($W_{Ref}$) and that is inductively coupled with its secondary side with the stator windings.

According to the principle of operation a resolver is configured such that at the input side an excitation with a carrier frequency occurs and such that due to the resolver motion this signal is amplitude-modulated and is transformed to the output side. Due to the orthogonal arrangement of the windings the amplitude-modulated output signal have a phase shift of 90° to each other and are available for further analysis. There are several analysis methods for resolvers.

The application of a resolver may be diverse. Sometimes there is measured and integrated the angular speed and not the rotation angle. It is, however, essential, that one is able to determine, either directly or indirectly, for example by integration, the angular position of the rotor with respect to the stator. The angular information or the rotation speed information is supplied to a frequency inverter or to any other electronic motor controller and is used therein for controlling the rotation speed and/or the torque.

When the resolver fails for some reason the electronic motor controller does not receive a signal. A failure is to be understood as any state in which the correct rotation angle signal is not received by the motor controller. This can be, for instance, an interruption of the signal line between the resolver and the motor controller. In case that the motor controller does not receive the correct signal, this will result in a wrong behaviour during operation. For example, it may be that a motor controller upon using a current vector control regime with rotation speed feed back as is usual nowadays adjusts the rotation speed of the motor to its maximum, when the signal line is interrupted. It is evident that such operating states are not desirable.

In the prior art several devices and methods are known in order to identify such failure situations in the context of rotational angle sensors so as to subsequently take measures for error correction or at least for error treatment. For example the rotational angle sensor may be configured in a redundant manner, that is, a second rotational angle sensor may be provided and the results of both rotational angle sensors may be compared with each other. Moreover, the operation of the rotational angle sensor may be monitored by means of a built-in control electronic.

Furthermore, it is possible to detect a wire breakage in the conductors to and from the resolver that is used in electric machines for angle determination.

In order to identify wire breakage-based failures during the determination of angles typically the input and output signals of the resolver $W_{sin}$, $W_{cos}$, $W_{Ref}$ are electrically fed back and the current flow in these windings is analysed. In this manner the conductor lines to and from the resolver including the windings connected thereto are monitored. A direct monitoring of the windings of the rotary transformer in the rotor is, however, not possible in this manner. A monitoring of the winding can only be accomplished indirectly and in this case the used resolver analysis procedure has an essential influence on the applicable options.

A usual resolver analysis method is the so-called backwards procedure in which the orthogonal windings of the resolver as $W_{sin}$ and $W_{cos}$ are supplied with current such that no voltage is induced in the excitation winding as $W_{Ref}$. If the resolver rotor is rotated in this state of signal equilibrium, then this equilibrium state is disturbed and a voltage is transferred into the winding $W_{Ref}$. In this procedure this voltage is supplied to a controller (the so-called tracking controller), which corrects the voltage amplitudes at the orthogonal coils such that the voltage across the excitation winding again becomes zero Volt and the signal equilibrium is re-established. Since the rotor of the resolver is a rotary transformer having respective windings, naturally only AC signals can be transmitted by the transformer. For this reason the input signals of the resolver are amplitude-modulated carrier frequency signals.

The complete monitoring of a system that is based on the above described tracking control principle is difficult. In such a system in the "normal state", i.e., when the tracking control loop is adjusted, about zero Volt are measured at the input amplifier. The same voltage amplitude, however, is also present when a wire breakage occurs in the windings of the rotary transformer of the resolver. Therefore, errors within the resolver are not detectable.

One possible approach for detecting such an error is the usage of a so-called test mismatch angle. In this manner the tracking control loop does not receive the target value being equal to zero Volt, but being not equal to zero. In such a system the signal at the input amplifier is also unequal to zero in the adjusted state and a wire breakage would thus be detectable.

Typically, the input amplifier is, however, dimensioned such that even low mismatch angles that already occur during, for instance, dynamic events, will saturate the input amplifier. This high amplification is necessary, since only with this measure the control loop is able to follow highly dynamic motions Measurements revealed that the test mismatch angle has to be in the order of magnitude of about 1° in order to be unambiguously detectable. Unfortunately, this fact and the required high amplification of the input amplifier cause an evidently asymmetric modulation of the input amplifier, thereby negatively affecting the control loop stability.

This known technique may thus not always be applied.

SUMMARY OF THE DISCLOSURE

It is an object to provide a monitoring of a rotational angle sensor in an electric machine, and mitigate adverse influence on the control loop stability and security.

This object is solved by a monitoring method of a rotational angle sensor and by an apparatus for monitoring a rotational angle sensor.

The invention is able to detect an error and/or a wire breakage in the windings of the rotary transformer of the rotational angle sensor, e.g., a resolver.

According to the disclosure the monitoring of a rotational angle sensor is accomplished by generating an interference signal in one-second cycles or intervals. This well-directed interference signal is provided in an alternating manner for both windings of the rotational angle sensor the SIN and the COS winding.

After evaluation via an input amplifier and the monitoring an interference indication signal at the output of the input amplifier is converted into a signal that is not equal to zero Volts, when no error or no breakage occur in the system, and is converted into a signal being equal to zero Volt, when an error or a breakage in the system exists.

After correcting the error a further evaluation and monitoring are performed.

For the monitoring of the rotational angle sensor in the electric machine a so-called failure detection block is important that consists of an interference signal generator, a signal analysis block and a switch. It is connected to the carrier frequency generator.

During the monitoring the interference signal generator generates in one-second intervals, in an alternating manner for both windings of the rotational angle sensor, a specific interference signal analysed via an input amplifier and being monitored. When the interference indication signal at the output of the input amplifier is a signal that is not equal to zero, there is no failure or breakage in the system. The signal corresponds to zero Volt, when an error or a breakage exist in the system.

The circuit of the monitoring system and the method of monitoring function in this way. They may be combined.

For explaining a rotational angle sensor that in one embodiment is configured as a resolver it should be mentioned that it represents a magnetically coupled system, as is expressed by the previously described situation of a rotary transformer. There is a rotating winding and there are two stationary windings, the latter one is called stator winding. The rotating winding is called rotor winding or also "excitation winding". For the example of a resolver as a rotational angle sensor, in short also referred to as "encoder", the following explanation should be given.

The resolver comprises an excitation winding at the primary side (as a rotating winding) and two secondary windings of the stator, orthogonally arranged to each other (as stationary windings) and mechanically emulates a trigonometric addition theorem.

In the "backwards procedure" the resolver is not supplied with current, as actually structurally intended, via the excitation winding, but the two secondary windings are supplied with current and the transfer result is measured in the excitation winding via the input amplifier. This is the result of the response to the carrier signal.

The current injection of the two secondary windings is done such that the fields of the two secondary windings neutralize each other and no voltage is induced in the excitation winding. If, however, some voltage is induced in the excitation winding a control loop corrects the amplitudes of the two (stationary) secondary windings, until the signal at the excitation winding is again equal to zero.

The mathematical basis is the addition theorem that is emulated by the resolver.

If it is referred to the signal zero, this signal is to be understood as an alternating (AC) signal that the carrier frequency signals induce from the stator windings in the excitation winding (as a rotary winding, here used as a receiver winding) as an alternating signal. The control loop provides for the steady state and also effects that no alternating signal exists at the input of the input amplifier, or also at the output thereof, i.e., in this sense the alternating signal is zero (a measurement via the RMS value is recommendable).

This zero condition is also obtained, as previously described in the prior art, when the transfer ratio ü is faulty and an error or a wire breakage exists in the winding system of the resolver. In this case the claimed invention ensures that via short pulses, referred to as "generating interference signals in cycles of a second", asymmetric conditions are injected that produce an alternating signal. As a consequence of the interference signal the indication signal at the input and also at the output of the input amplifier will be generated. It is an interplay being not equal to zero in the sense that an alternating signal with an amplitude and an effective value is present, and it may be assumed that no failure or wire breakage exists in the system of the resolver. If such a failure would exist, an alternating signal would not be generated at one or another interference signal and the signal would be equal to zero, in other words, it would not exist as an alternating signal. In this case it can be monitored that a failure or a wire breakage is present in the system of the resolver.

In order to be symmetric the interference signal is alternately generated in one winding and in the other winding. In such a manner errors in the two windings can be detected. The wording that the signal occurs in one-second intervals or cycles means that is has a post-signal time period that is significantly greater than the active signal time period in which the interference signal actively interferes with a voltage of the windings in the meaning that it is suppressed or the carrier frequency is switched off or suppressed. This happens in the way of a Dirac pulse that is symbolically represented for the interference signals by $\delta_i$ wherein $i=1, \ldots, n$ symbolizes a sequence of interference signals whose pulse width is small compared to the repetition time. This is the meaning of the interference signal in one-second intervals that affects alternately in one or the other of the two windings. The signal voltages for these windings, described later on in the specification as $U_1$ and $U_2$, are set alternately to zero and in this way the transfer of one of these signals to the excitation side is induced if, and as long as, no failure in the sense of a wire breakage or an error is present. If on the other hand a failure is present then the transformation ratio of the windings (stator winding to rotor winding and vice versa) is equal to zero and the voltage at the input amplifier, which connects to the excitation winding, also becomes zero. The control loop would loose its effect, i.e., it would be provided with a measurement signal that indicates an adjusted state although a technical error exists in the resolver.

The switching off of the carrier frequency of the generator, however, would disturb the controller. During this time interval the controller is halted, which is accomplished by a switch. It opens the feed back, temporarily terminates the control function. The supply of a null signal as a control error representing a non-received signal voltage at the rotating winding indicates to the control loop that an adjusted state exists, since the target value of the control loop is configured as a tracking controller and it receives as a target value the value zero. During this "immobilization" or during the halt of the controller, where no measurements are performed, the interference signal tests, by switching off one of the two alternating signals at a respective one of the two stator windings, whether the transformation ratio of the windings of the rotary transformer (in the meaning of the resolver) is still operational and present, which is represented at the output of the input amplifier by providing a voltage that is detected by a circuit that is to be described as an interference detection circuit or signal analysis circuit. It is supplied with the interference signal so that it knows when it can detect an error, and it is also provided with the output signal of the input amplifier so as to enable to determine whether a desirably existing signal at the input amplifier is received. Also during this time interval of the interference state, i.e., during the presence of the interference signal, the control is, as discussed before, stalled but only to such an extent that it does not perform or adjust any transient oscillations.

Transmitting two actuating variables to the stator winding of the rotational angle sensor represents angle dependent amplitude-modulated frequency signals that are provided by an amplitude modulator. The transmitting is to be understood such that these actuating variables are provided by the amplitude modulator as a sine variable and a cosine variable for a sine winding and a cosine winding, respectively, of the rotational angle sensor.

The thus generated signal at the rotating winding, when operated in forward direction, referred to as excitation winding, when operated in backward direction, referred to as receiver winding, forms a signal reaction that is adjusted by the control loop during normal operation, that is, when the resolver is operable, such that the output signal at the excitation winding changes to zero. Also in this case an alternating signal is meant, which alternating signal is not present and has no effective value. The analysis in the input amplifier functionally ensures for the tracking controller and the present control loop that the error variable becomes equal to zero and the output signal at the input amplifier positioned downstream of the receiver winding is adjusted to zero.

If the interference signal is generated, one cannot speak of a proper functional generation of an output signal at the "excitation winding" used as receiver winding for a short time during the duration of the interference. Nevertheless, there is also an analysis that occurs via the same input amplifier that provides an output signal of zero Volt, when an error or a breakage exist in the system. It would not be equal to zero when the signals for the manipulated variables are generated in a functional manner and the interference signal does not actively intervene.

An interaction of the control loop is expressed by the controlling to a value zero at the excitation winding, according to the invention used as a receiver winding, which is referred to as normal operation.

The backward procedure or the usage of a resolver in a backward mode is expressed in such a manner that two actuating variables are "sent" to the stator windings (supplied thereto) and the signal responses are analysed at the excitation winding used as receiver winding, to which end the input amplifier is used. This functional state including the tracking control loop uses a difference unit, the controller itself, an integrator and said amplitude modulator. It comprises two signal blocks, one for cosine and one for sine, and two multipliers for modulation with the carrier signal. This carrier signal is output by a frequency generator that is denoted as "carrier frequency generator". Via two separated amplifiers the stator windings of the resolver are processed, which are arranged in the rotational angle sensor as two windings orthogonal to each other.

The induced signal in the excitation winding used as receiver winding is supplied to the input amplifier that outputs, for the adjusted state, a null output signal as "no alternating signal" and provides this to a demodulator that forms in the feed back the closed loop for the difference unit. Here it is provided functionally acting switch that halts the control loop. The halting is accomplished by providing an adjusted equilibrium state for the difference unit. The halting thus ensures that the control loop is not affected by the injected interference variable. During this time a failure detection block provides for a detection of the signal at the output of the input amplifier. During the defined time intervals, i.e., during the duration of an interference signal, a signal in the form of an alternating signal that is not equal to zero should be applied here. In a sense the interference signal is included in the input signal of the input amplifier, however in an opposite imagined direction.

The switching off of one of the actuating variables signals or of their carrier frequency ensures that associated therewith an alternating signal is present at the input amplifier, when the resolver is technically functioning properly and no error or breakage exists in the system.

The failure detection block has a signal analysis block that analyses said input signal of the input amplifier or its output signal after passing through the demodulator and while the control loop is deactivated. This temporary deactivation corresponds to the generation of the interference signal in one-second intervals. If the failure detection block detects the non-presence of an output voltage at the input amplifier during the active phase of the interference signal, the failure detection block outputs an error signal or failure indication F.

The switch is disposed in the feed back branch of the controller. It blocks or switches off the measured signal. Preferably, the switch may provide a null signal to the difference unit of the control loop while the interference signal is effective.

BRIEF DESCRIPTION OF THE DRAWINGS

In the following the invention will be discussed in more detail by referring to embodiments in the drawings circuit examples and by referring to methods of operation of these examples.

FIG. 1 is as schematic view of a monitoring device including a resolver R.

DETAILED DESCRIPTION OF EMBODIMENTS

The device for monitoring a rotational angle sensor at an electric machine has a control difference unit 1, a controller 2 and an integrator 3 that is connected with the amplitude modulator 4.

The amplitude modulator 4 consists of a sine signal block 5 and a cosine signal block 6, as well as multipliers 7a and 7b, and a carrier frequency generator 8. The latter multipliers are connected to the (stationary) windings $W_{sin}$, $W_{cos}$ (stator windings 12 as 12a and 12b) of the rotational angle sensor R via two amplifiers 10a, 10b to supply actuating values to the windings.

The signal of the excitation winding $W_{Ref}$ as a rotating winding 13 is supplied to a demodulator 9 via the input amplifier V2 (or 11).

There is provided a failure detection block 14 that consists of the interference signal generator 15, a signal analysis block 16 and a switch device as a switch 17 and that is connected to the carrier frequency generator 8 for transmitting signals $\delta_i$, i=1, 2, ... n. Likewise, the interference signal generator 15 is coupled to the switch device 17. Also, $\delta_i$ is coupled with the signal analysis block 16.

The embodiment of FIG. 1 illustrates a monitoring method in the backward procedure (backward mode), wherein the rotational angle sensor is configured as a resolver and the orthogonal windings 12a, 12b of the resolver stator are supplied with current such that no signal is transmitted to the excitation winding $W_{Ref}$—used as receiver winding—of the resolver. In this case the stator voltages are composed of a carrier frequency part and rotational angle dependent amplification factor (cf. the respective signal diagrams in the FIGURE).

The control loop for the stator windings is configured as follows.

The rotational angle dependent amplification factor is determined by a controller 2 having an integrator 3 at the downstream side. The controller 2 receives as an input variable the difference between the target value and the demodulated voltage $U_{err}$ of the rotating excitation winding 13a of the resolver. The controller 2 provides as an output variable a rotation speed that is integrated in the downstream integrator 3 to obtain an angle $\epsilon'$ (or $\epsilon^*$). If the control loop is adjusted (operated functionally) then the obtained angle $\epsilon'$ corresponds to the real angle $\epsilon$ and the demodulated voltage $U_{err}$ is zero Volt (as alternating voltage).

The excitation winding 13a may be a group of windings 13a, 13b and 13c. Its measurement signal is for the input amplifier 11.

The following equations describe these connections

Rotation Angle of the Rotor:

$\epsilon$

Obtained Rotation Angle:

$\epsilon'$

Carrier Frequency Signal:

$U_1 = \hat{u} \cdot \sin(\omega \cdot t)$

Signals of the Stator Windings:

$U_1 = \hat{u} \cdot \sin(\omega \cdot t) \cdot \cos \epsilon'$ $U_2 = \hat{u} \cdot \sin(\omega \cdot t) \cdot \sin \epsilon'$ Signal at the Excitation Winding:

$U_{err} = (U_1 \cdot \sin \epsilon + U_2 \cdot \cos \epsilon) \cdot \ddot{u}$

Transformation Ratio of Windings:

$\ddot{u}$

In the adjusted state $\epsilon = \epsilon'$. Thus, this yields $U_{err} = (\hat{u} \cdot \sin(\omega \cdot t) \cdot \cos \epsilon' \cdot \sin \epsilon + \sin(\omega \cdot t) \cdot \sin \epsilon' \cdot \cos \epsilon) \cdot \ddot{u}$ $U_{err} = \hat{u} \cdot \sin(\omega \cdot t) \cdot (\cos \epsilon' \cdot \sin \epsilon + \sin \epsilon' \cdot \cos \epsilon) \cdot \ddot{u}$ $U_{err} = \hat{u} \cdot \sin(\omega \cdot t) \cdot (\sin(\epsilon' - \epsilon)) \cdot \ddot{u}$ $U_{err} = 0, wenn\ \epsilon' \approx \epsilon$ If, for example, $\ddot{u}=0$ due to a failure in the rotor of the resolver R, then $U_{err}$ is also equal to zero and the control loop is without effect, this, however, not being recognizable.

In order to solve this problem the signals $U_1$ and $U_2$ are to be set to zero in an alternating manner and to force a transmission to the "excitation side" (as measurement winding 13). This happens in one-second intervals by means of pulse signals $\delta_I$ of the interference signal generator 15.

If one sets one signal, either $U_1$ or $U_2$, equal to zero, then the following $U_{err}$ is obtained $U_1 = 0: U_{err} = \hat{u} \cdot \sin(\omega \cdot t) \cdot (\sin \epsilon' \cdot \cos \epsilon) \cdot \ddot{u}$ $U_2 = 0: U_{err} = \hat{u} \cdot \sin(\omega \cdot t) \cdot (\cos \epsilon' \cdot \sin \epsilon) \cdot \ddot{u}$ If $\ddot{u} \neq 0$ (the resolver is electrically in a correct state), then during an interference signal $\delta_i$ then the measured $U_{err}$ is also $\neq 0 \rightarrow$ it can be analysed by block 16. This block is coupled to the interference signal generator 15 for the time coordination.

Since also the angle $\epsilon$ may cause the factor $\cos \epsilon$ or $\sin \epsilon$ to be equal to zero, this uncertainty is circumvented by an alternating nulling of $U_1$ and $U_2$.

Since the switching off (as an interference signal) of the carrier frequency of the carrier frequency generator 8 for one of the two manipulated variables $U_1$, $U_2$ interferes with the demodulation of the demodulator 9 and thus disturbs the controller 2, the control activity is thus "stopped" during this time (the switching off of the carrier frequency). This is accomplished via the switch 17. It disrupts the feed back and "temporarily" ends the controlling. To this end a toggle switch can inject into the difference location 11a zero signal as a measurement signal.

In addition, the time period of switching off may be adapted to the filter characteristics of the electric system in order to reduce the duration of transient oscillations.

The signal names $u_{11}$, $u_{12}$, $u_{13}$ and others are evident from FIG. 1 and the position shown therein, where they occur.

The invention claimed is:

1. A method of monitoring a system having a resolver in a control loop, the resolver coupled to an electric machine, the method comprising the steps of:
   transmitting two angle dependent amplitude-modulated carrier frequency signals to two stator windings of the resolver;
   analyzing a carrier frequency signal response via an input amplifier providing an output signal at an output thereof, the output signal being substantially equal to zero if the amplitude-modulated signals are both functionally generated;
   generating a time interval interference signal alternating for the amplitude-modulated carrier-frequency signals fed to the two stator windings of the resolver;
   wherein as a result of the interference signal, an interference indication signal is present at the output of the input amplifier as a signal that is different from zero if an error or a wire breakage does not exist, and as a signal that is equal to zero if an error or a broken wire exists within the system.

2. The method of claim 1, further comprising:
   providing a failure detection circuit for a safety related evaluation and monitoring of the resolver, the failure detection circuit having a generator generating the interference signal in or for the two stator windings of the resolver.

3. The method of claim 2, wherein the failure detection circuit comprises a signal analysis section analyzing the output signal of the input amplifier and provides a signal for failure detection while the control loop is temporarily disabled by a switch device.

4. The method of claim 3, wherein a switch of the switch device blocks or switches off a feedback of the output signal of the input amplifier in a feedback branch of the control loop.

5. The method of claim 4, wherein the switch is a toggling switch.

6. The method of claim 1, wherein the amplitude-modulated signals provide a voltage at each of the stator windings of the resolver, an amplitude of each the voltage being continuously adjusted during normal operation such that an induced voltage at one rotor winding as excitation winding of the resolver is zero.

7. The method of claim 1, wherein the resolver is operated in a backward mode and is coupled to the electric machine, said control loop includes a control difference unit, a controller connected to an amplitude modulator via an integrator, wherein said amplitude modulator comprises a sine signal circuit, a cosine signal circuit, and two multipliers and a carrier frequency generator, and two amplifiers supply currents to the two stator windings of the resolver.

8. The method of claim 1, wherein a signal induced in an excitation winding as a receiver winding of the resolver is supplied, via the input amplifier and a demodulator, as feedback to the control loop.

9. The method of claim 1, further comprising providing a failure detection circuit that couples the interference signals into a carrier frequency generator during given time periods in one-second intervals, the interference signals originating from an interference signal generator, thereby disturbing or nulling a respective one of the carrier frequency signals provided by the carrier frequency, generator.

10. The method of claim 9, the disturbing provides including of the interference signal into the input signal of the input amplifier or generating an input signal as an alternating signal at the input amplifier.

11. The method of claim 1, wherein, for functional generation of the amplitude-modulated signals, the output signal of the input amplifier is an alternating signal that is substantially equal to zero.

12. The method of claim 1, wherein the output signal of the input amplifier is an alternating signal during a length of time of the interference signal.

13. A method of monitoring a rotational angle system having a rotational angle sensor operatively coupled to an electric machine, comprising the steps of
transmitting two amplitude-modulated carrier frequency signals to two stationary windings of the rotational angle sensor;
providing an input amplifier supplying an output signal at an output thereof, the output signal being substantially equal to zero upon functionally properly generating both carrier frequency signals;
generating an interference signal alternating for both carrier frequency signals fed to the stationary windings of the rotational angle sensor, thereby creating an interference indication signal at the output of the input amplifier, as a signal that is not equal to zero when no error or no breakage is present within the rotational angle system, and as a signal that is equal to zero when an error or a breakage is present within the rotational angle system.

14. The method of claim 13, further comprising providing a failure detection circuit for a safety related monitoring of the rotational angle sensor.

15. The method of claim 14, said failure detection circuit having a combination of an interference signal generator, a signal analysis circuit, and a switch device, the failure detection circuit being connected to a carrier frequency generator supplying the carrier frequency signals.

16. The method of claim 14, further comprising performing a further analysis and monitoring of the rotational angle sensor after a failure detection of the failure detection circuit.

17. The method of claim 13, wherein voltage amplitudes at each of the stator windings of the rotational angle sensor are adjusted by a control loop such that a measured voltage is zero at an excitation winding used as a receiver winding of the rotational angle sensor.

18. The method of claim 13, wherein the stationary windings are oriented orthogonally to each other.

19. The method of claim 13, wherein the amplitude-modulated signals as carrier frequency signals are angle-dependent.

20. A circuit assembly for monitoring a rotational angle sensor at an electric machine, said circuit assembly having a control difference unit, a controller connected via an integrator to an amplitude modulator having a sine signal function and a cosine signal function, two multipliers and a carrier frequency generator, wherein said frequency generator is connectable, via two amplifiers, with stator windings of the rotational angle sensor, an excitation winding thereof being connectable to a demodulator via an input amplifier, and comprising a failure detection circuit having a combination of an interference signal generator, a signal analysis circuit and a switch device, wherein the failure detection circuit is connected to the carrier frequency generator.

21. The circuit assembly of claim 20, wherein the rotational angle sensor is configured as resolver.

22. The circuit assembly of claim 20, wherein the interference signal generator is configured to provide interference signals to the carrier frequency generator in one-second intervals.

23. The circuit assembly of claim 20, wherein the generation of the interference signals is time-coupled to the switch device for disabling a control loop, the control loop comprising the control difference unit, the controller, the integrator and an amplitude modulator, the multipliers, and the two amplifiers, the stator windings, the excitation winding, the demodulator and input amplifier and the switch device.

24. A device for monitoring a resolver operated in a backward mode at an electric machine, comprising:
a control difference unit;
a controller connected, via an integrator, to an amplitude modulator, the amplitude modulator having a sine signal unit and a cosine signal unit and two multipliers;
a carrier frequency generator;
two amplifiers that supply current to stator windings of the resolver;
wherein a signal induced in a rotatable winding provides a feedback signal of a control loop via an input amplifier, a demodulator, and a switch;
a failure detection circuit including an interference signal generator configured to couple an interference signal into the carrier frequency generator during defined time periods;
wherein an output signal of the input amplifier is evaluated by a signal analysis circuit for a failure detection, while or as long as the control loop is temporarily disabled by the switch.

* * * * *